Patented Apr. 13, 1954

2,675,299

UNITED STATES PATENT OFFICE 2,675,299

HYDRAZINE MANUFACTURE

John F. Haller, Niagara Falls, N. Y., assignor to Mathieson Chemical Corporation, a corporation of Virginia No Drawing. Application April 10, 1950, Serial No. 155,121

2 Claims. (Cl. 23—190)

My invention relates to the manufacture of hydrazine by direct reaction of chlorine and ammonia. Present commercial manufacture of hydrazine depends upon application of the Raschig process which requires reaction of caustic soda and chlorine to sodium hypochlorite, oxidation of the ammonia by the hypochlorite to chloramine and reduction of the chloramine with excess ammonia to hydrazine. The product is produced in highly diluted form, e. g. about 1 to 1.5 per cent, in aqueous admixture. Expensive concentrating and separating steps to remove excess ammonia, salt and water are required to recover a product containing about 85 per cent hydrazine hydrate. The 85 per cent hydrate must be chemically treated in further expensive dehydrating steps as by acid absorption and ammonolysis of the resulting salts to produce hydrazine in suitable commercial anhydrous form. Obviously, direct reaction of chlorine and ammonia to produce hydrazine would be an attractive possibility in reducing the cost and complexity of processing, particularly, if the product could be directly recovered in anhydrous form. It is well known, however, that the reaction of chlorine and ammonia is difficult to control and proceeds with great rapidity to form nitrogen trichloride with consequent danger of violent explosion. For this reason, apparently, production of hydrazine by direct reaction of chlorine and ammonia has not been considered a commercial possibility. I have discovered, however, that the reaction proceeds smoothly and almost quantitatively when conducted stepwise on an adsorptive surface such as activated alumina so that one reactant is adsorbed on the adsorptive surface before contact with the second reactant. This process I have described and claimed in my copending application Serial No. 155,122, filed April 10, 1950. I have now discovered that excess ammonia and chlorine may be first reacted with special advantage to produce a gas mixture of chloramine in ammonia which may be contacted with activated alumina to produce hydrazine. The process has the special advantage that by-product ammonium chloride produced in the initial reaction of ammonia with chlorine in gas phase can be filtered out of the gas stream or otherwise separated before contact with the adsorptive surface so that reactivation of the alumina contact material is facilitated. In addition, the reaction may be completed in a single pass of the gas feed mixture. Thus according to my invention, a gaseous mixture of chloramine and excess ammonia is contacted with activated alumina and hydrazine is recovered from the adsorptive surfaces of the alumina by desorption.

In the practice of my invention, a stream of chloramine in excess ammonia is advantageously prepared by the method described and claimed in copending application Serial No. 242,979 filed August 21, 1951 by myself and Theodore H. Dexter. Chlorine and ammonia are mixed in gas stream with the ammonia in large excess of the stoichiometric proportion, and the temperature rise is limited to avoid decomposition of chloramine, usually to about 100° C. maximum. The ammonia excess is greater than 4:1 and advantageously is 15:1 to 100:1. Nitrogen or other inert gas is advantageously employed as a diluent. The mixture is passed through a filter or cyclone separator to remove by-product ammonium chloride and is then contacted with activated alumina, usually in finely divided form so as to obtain effective gas-solid contact.

I have been unable to ascertain as yet whether the alumina functions catalytically in promoting and directing the hydrazine reaction or whether the mechanism of stepwise adsorption merely fixed the reactants and primary product against further reaction. In any event the reaction proceeds smoothly, and the process requires no difficult means of control. The solid surface also appears to assist reaction control by taking up the heat of reaction so that decomposition and formation of nitrogen trichloride is avoided.

The desorption of the adsorbed product from the surface of the alumina may be accomplished by a suitable means. For example, the adsorbent may be washed with water or other aqueous medium such as dilute acid or alkali to obtain the hydrazine as an aqueous solution which is separated from the alumina by filtration or decantation. It is advantageous of course to dry and reactivate the alumina by heating for recycle to the first adsorption step. Most advantageously, however, anhydrous hydrazine is obtained by displacing the adsorbed product from the surface of the adsorbent by heating the latter in a stream of a suitable gas. Ammonia is particularly desirable for this purpose since the anhydrous hydrazine may be obtained by condensing the entire mixture and fractionating excess ammonia from the residual hydrazine.

The activated alumina and reactants may be handled in a variety of ways. Granular alumina is conveniently handled as a fixed bed exposed to alternate cycles of reactant and purge gas streams. For example, a fixed bed of alumina is contacted with the chloramine-rich ammonia gas stream, the gas phase is purged from the reactor by means of an inert gas, e. g. air or nitrogen, and the bed is treated for desorption as by hot gas flow or by aqueous extraction. Alternatively, granular alumina may be handled with a moving bed technique in which a slowly descending alumina bed is subjected to the action of the gas feed. The contacting and product recovery may be effected in separate reactors or in a single reactor by introducing and discharging the reactants at different levels advantageously separated by purge zones to recover unreacted gases for recycle and to reduce the quantity of materials to be handled in product recovery. The contact advantageously is countercurrent. Finely divided activated alumina may be handled in a suspension system or advantageously at higher proportions of solid to gas according to the fluidized solids technique. The solid-gas mixture may be passed, for example, through a system of serially connected reaction tubes and separating chambers; e. g. of the cyclone type. If increased adsorption time factor or increased separating and cooling time is desired, large settler-reactor chambers may be employed in conjunction with the mixing and reaction tubes. The handling equipment and mixing, timing and control valves, and the sealing and separating devices are representative of the types employed in well-known gas-solids handling systems such as the catalytic cracking systems of the petroleum industry, for example.

The following example illustrates the formation of hydrazine by alumina activation. The conditions and details of procedure are not intended to be representative of larger scale methods of handling.

*Example*

A stream of chloramine in excess ammonia gas was prepared by feeding a stream of chlorine into a stream of ammonia gas with the ammonia in large excess and with nitrogen gas dilution in the zone of intermingling. The mixed gas stream was filtered through glass wool and passed over granular activated alumina. The production of hydrazine in substantial yield was confirmed by water extraction and analysis of the extract.

I claim:
1. The method of manufacturing hydrazine which comprises contacting a mixture of chloramine and excess over the stoichiometric equivalent of ammonia gas with activated alumina and recovering the product by desorption.
2. The method of manufacturing hydrazine which comprises reacting chlorine and ammonia gas in admixture, the ratio of ammonia to chlorine being in excess of 4:1, to produce solid ammonium chloride and a gas stream of chloramine and unreacted ammonia, separating ammonium chloride from the mixture, contacting the gas stream with activated alumina and recovering hydrazine from the alumina by desorption.

References Cited in the file of this patent

FOREIGN PATENTS

| Number | Country | Date |
|---|---|---|
| 22,957 | Great Britain | A. D. 1907 |

OTHER REFERENCES

J. W. Mellor's "Comprehensive Treatise on Inorganic and Theoretical Chemistry," vol. 8, 1928 ed., pages 309, 310. Longmans, Green and Co., N. Y., publishers.